Aug. 24, 1926.  
E. RATHBUN  
1,597,248  
INTERNAL COMBUSTION ENGINE  
Filed May 7, 1925  
2 Sheets-Sheet 1

INVENTOR.  
Edward Rathbun  
BY Herbert G. Ogden  
HIS ATTORNEY

Aug. 24, 1926.

E. RATHBUN 1,597,248

INTERNAL COMBUSTION ENGINE

Filed May 7, 1925   2 Sheets-Sheet 2

INVENTOR.
Edward Rathbun
BY
HIS ATTORNEY

Patented Aug. 24, 1926.

1,597,248

UNITED STATES PATENT OFFICE.

EDWARD RATHBUN, OF TOLEDO, OHIO, ASSIGNOR TO INGERSOLL-RAND COMPANY, OF JERSEY CITY, NEW JERSEY, A CORPORATION OF NEW JERSEY.

INTERNAL-COMBUSTION ENGINE.

Application filed May 7, 1925. Serial No. 28,567.

This invention relates to internal combustion engines, and more particularly to that type in which liquid fuel, such as oil, is injected into a combustion chamber in the cylinder head in which air has been or is being compressed.

In this type of engine, combustion takes place in a compression space or combustion chamber and the motive force tending to actuate the piston is produced by the greatly increased pressure resulting from the rise in temperature caused by the heat generated in the combustion of the fuel. It is, therefore, desirable that a maximum amount of air be drawn into the cylinder and combustion chamber and that the air drawn into the cylinder be as cool as possible. If air is drawn into an excessively hot chamber, it immediately expands to a greater volume and thus a relatively small quantity will be drawn into the cylinder. The coolest part of the interior of an engine of this type is the side wall of the cylinder and the hottest parts are the piston head and the combustion chamber. It is therefore, found most desirable to draw the fresh air into the cylinder remote from the combustion chamber and thereafter to compress the air into the combustion chamber.

The principal object of this invention is therefore, to draw the air into the cylinder on the suction stroke of the piston in such a manner as to avoid excessive heating of the air. This is accomplished by positioning the inlet valve remote from the combustion chamber and in such a manner that there is substantially no compression space except in the combustion chamber. This eliminates pockets containing dead air which is not utilized in combustion.

Other objects of the invention will be in part obvious and in part pointed out hereinafter.

Figure 1:
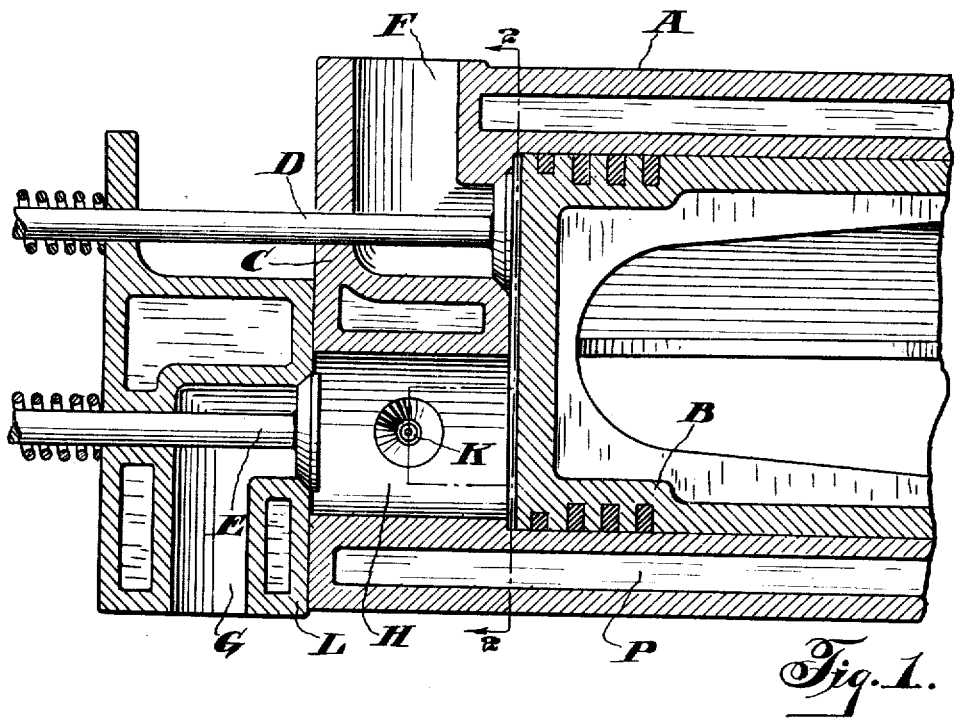
Figure 2:
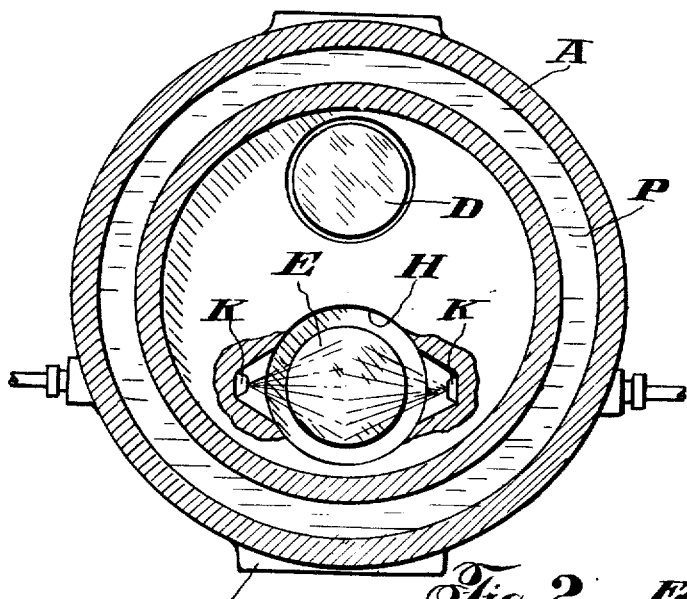
Figure 3:
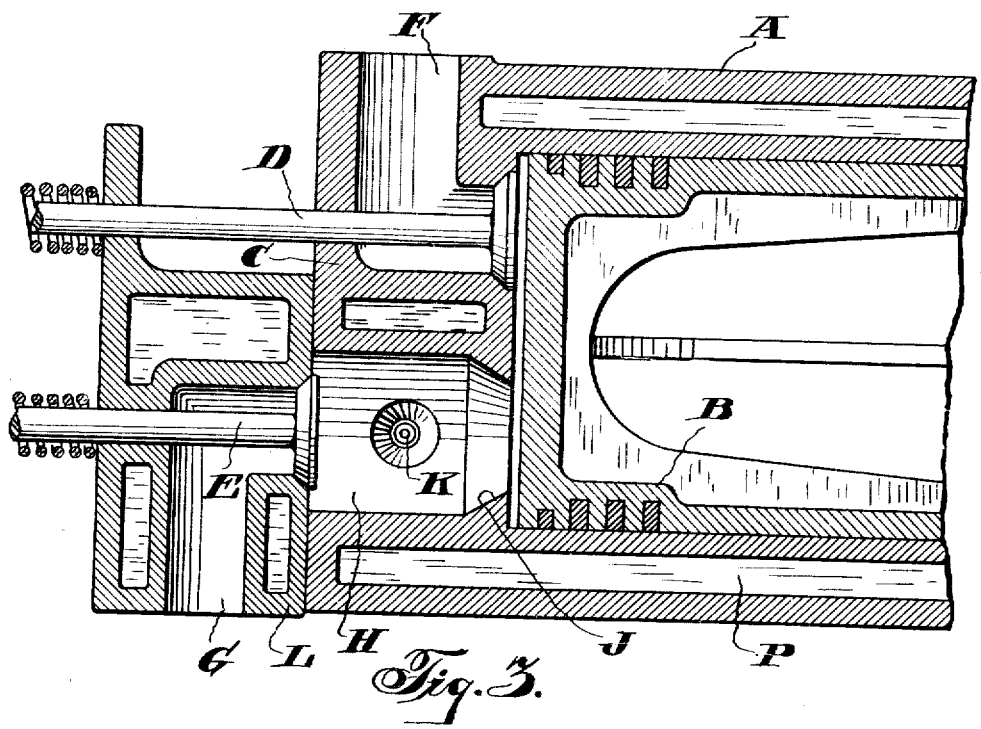

In the drawing forming part of this specification, and in which similar reference characters refer to similar parts, Figure 1 is a longitudinal sectional view of a cylinder and a cylinder head constructed in accordance with the practice of the invention, Figure 2 is a cross section taken along the line 2—2 looking in the direction of the arrows, and Figure 3 is a modification in longitudinal section of a cylinder and a cylinder head in which the combustion chamber is of the type having a neck at its juncture with the cylinder proper.

Referring to the drawings, and more particularly to Figures 1 and 2, the upper portion of a cylinder A is shown in which a piston B, which may be water cooled if desired, is adapted to reciprocate in the piston space. The cylinder A is provided with a head C having an inlet valve D and an exhaust valve E arranged to control communication from the interior of the cylinder A with inlet and exhaust passages F and G respectively. The valves D and E may be operated by any suitable mechanism (not shown). The exhaust valve E is arranged to open into a compression space H which may be of any suitable form, such as cylindrical, as shown in Figure 1, or provided with a neck at its juncture with the interior of the cylinder, as at J (Figure 3). This neck is of less diameter than the smallest diameter of the compression space and the preferable form of the compression space is that indicated constituted of a central region and two opposed lateral extension cavities.

Means are provided for injecting liquid fuel into the compression space and to this end a pair of spray nozzles K disposed on opposite sides of the combustion chamber H preferably in the extension cavities are arranged to inject fuel simultaneously into spray cones meeting approximately at the central region of the compression space H as shown in Figure 2 and illustrated more fully in U. S. Patent No. 1,517,015 granted November 25, 1924, to W. T. Price, it being understood that the invention is not confined to such nozzles.

The exhaust passage G is preferably located in a water cooled block L suitably mounted over the compression space H and forming an air tight closure therefor. The compression space H may also be water jacketed and supplied with water from the same source as the water chamber P surrounding the walls of the cylinder A.

The longitudinal axis of the compression space H, as shown, lies within the peripheral confines of the cylinder bore and at one side of the longitudinal axis of said bore, so that sufficient area remains for seating the air inlet valve D in the inner surface of the cylinder head.

In accordance with the practice of this invention, the inlet valve D is thus located remote from the compression space H at the opposite side of the longitudinal axis of the cylinder adjacent the cylinder wall and opening directly into the piston space wholly within the periphery of the cylinder bore, so that as the piston B moves away from the compression space on its suction stroke, the air entering past the valve D into the cylinder encounters the walls of the cylinder A rather than the walls of the compression space H. The hottest parts of the engine are the compression space H and the head of the piston B. The air in entering the cylinder from the inlet does not come in contact with the walls of the compression space H since there is no vacuum in that space and as the piston B is moving rapidly downward and not much of the air entering the cylinder contacts with the piston head to produce a marked effect, a full charge of fresh air is therefore drawn into the cylinder on the suction stroke of the piston B. On the compression stroke of the piston B, the air drawn into the cylinder is forced into the compression space H and just prior to the completion of the piston compression stroke the fuel is injected into the compression space H through the nozzles K substantially as disclosed in U. S. Patent No. 1,517,015 referred to. Automatic ignition of the charge in the compression space H takes place due to the atomization of the fuel by the spray nozzles K and the pressure of air in the compression space H. Substantially no clearance exists between the head of the piston B and the lower face of the cylinder head C. Upon ignition of the fuel in the compression space H, the piston moves downwardly on the expansion stroke to deliver power to the crank shaft (not shown). Toward the end of the expansion stroke the exhaust valve E opens and the exhaust gases pass out through the exhaust passage G to atmosphere.

As has been said above, a great advantage of this construction is that the in-coming air is not heated and expanded by contact with the compression space walls so as to reduce the amount of air which can be taken into the cylinder on the suction stroke of the piston. The compression space H is therefore water jacketed in order to prevent too high a temperature in its walls.

Figure 3 shows a modification in the form of compression space in which there is a constriction at the neck J at the juncture of the combustion chamber H with the cylinder A. Such a neck may be used to produce greater turbulence in the combustion chamber H in some cases.

I claim:

1. An internal combustion engine comprising a cylinder having a piston space, a piston in said space, a cylinder head having a compression space formed therein and communicating with the piston space, the longitudinal axis of the compression space lying within the peripheral confines of the cylinder bore and at one side of the longitudinal axis of said bore, an exhaust valve in said compression space, an air inlet valve seated in the cylinder head and located remote from the compression space at the opposite side of the longitudinal axis of the cylinder adjacent the cylinder wall and opening directly into the piston space wholly within the periphery of the cylinder bore, whereby air in the cylinder is cooled by the cylinder walls and is prevented from entering the compression space on the suction stroke of the piston.

2. An internal combustion engine comprising a cylinder having a piston space, a piston in said space, a cylinder head having a compression space formed therein and communicating with the piston space, the longitudinal axis of the compression space lying within the peripheral confines of the cylinder bore and at one side of the longitudinal axis of said bore, an exhaust valve in said compression space, means for injecting fuel oil into said compression space, an air inlet valve seated in the inner face of the cylinder head and located remote from the compression space at the opposite side of the longitudinal axis of the cylinder adjacent the cylinder wall and opening directly into the piston space wholly within the periphery of the cylinder bore, whereby air in the cylinder is cooled by the cylinder walls and is prevented from entering the compression space on the suction stroke of the piston.

3. An internal combustion engine comprising a cylinder having a piston space, a piston in said space, a cylinder head having a compression space formed therein and communicating with the piston space by an opening of less diameter than the smallest diameter of the said compression space, said latter space being constituted of a central region and two opposed lateral extension cavities containing solid injection nozzles simultaneously delivering their fuel sprays into mutual impingement in said central region, the longitudinal axis of the compression space lying within the peripheral confines of the cylinder bore and at one side of the longitudinal axis of said bore, an air inlet valve seated in the cylinder head and located remote from the compression space at the opposite side of the longitudinal axis of the cylinder adjacent the cylinder wall and opening directly into the piston space wholly within the periphery of the cylinder bore, whereby air in the cylinder is cooled by the cylinder walls and is prevented from entering the compression space on the suction stroke of the piston.

In testimony whereof I have signed this specification.

EDWARD RATHBUN.

the longitudinal axis of said bore, an air inlet valve seated in the cylinder head and located remote from the compression space at the opposite side of the longitudinal axis of the cylinder adjacent the cylinder wall and opening directly into the piston space wholly within the periphery of the cylinder bore, whereby air in the cylinder is cooled by the cylinder walls and is prevented from entering the compression space on the suction stroke of the piston.

In testimony whereof I have signed this specification.

EDWARD RATHBUN.

CERTIFICATE OF CORRECTION.

Patent No. 1,597,248,. granted August 24, 1926.

to EDWARD RATHBUN.

It is hereby certified that the above mentioned patent was erroneously issued to Ingersoll-Rand Company, of Jersey City, New Jersey, a corporation of New Jersey, as assignee of the entire interest in said invention, whereas said Patent should have been issued to said Ingersoll-Rand Company and The Rathbun-Jones Engineering Company, Toledo, Ohio, a corporation of Ohio, as shown by the records of assignments in this office; and that the said Letters Patent should be read with this correction therein that the same may conform to the record of the case in the Patent Office.

Signed and sealed this 22nd day of February, A. D. 1927.

Seal.

M. J. Moore,
Acting Commissioner of Patents.

CERTIFICATE OF CORRECTION.

Patent No. 1,597,248, granted August 24, 1926.

to EDWARD RATHBUN.

It is hereby certified that the above mentioned patent was erroneously issued to Ingersoll-Rand Company, of Jersey City, New Jersey, a corporation of New Jersey, as assignee of the entire interest in said invention, whereas said Patent should have been issued to said Ingersoll-Rand Company and The Rathbun-Jones Engineering Company, Toledo, Ohio, a corporation of Ohio, as shown by the records of assignments in this office; and that the said Letters Patent should be read with this correction therein that the same may conform to the record of the case in the Patent Office.

Signed and sealed this 22nd day of February, A. D. 1927.

Seal.

M. J. Moore,
Acting Commissioner of Patents.